United States Patent
Bugl et al.

(10) Patent No.: US 10,377,419 B2
(45) Date of Patent: Aug. 13, 2019

(54) STEERING SHAFT FOR A MOTOR VEHICLE

(71) Applicants: ThyssenKrupp Presta AG, Eschen (LI); ThyssenKrupp AG, Essen (DE)

(72) Inventors: Michael Bugl, Feldkirch (AT); Martin Voscek, Alt St. Johann (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 127 days.

(21) Appl. No.: 15/121,288

(22) PCT Filed: Feb. 20, 2015

(86) PCT No.: PCT/EP2015/053666
§ 371 (c)(1),
(2) Date: Aug. 24, 2016

(87) PCT Pub. No.: WO2015/128267
PCT Pub. Date: Sep. 3, 2015

(65) Prior Publication Data
US 2017/0015353 A1  Jan. 19, 2017

(30) Foreign Application Priority Data

Feb. 25, 2014 (DE) .......... 10 2014 102 408

(51) Int. Cl.
B62D 7/22 (2006.01)
F16C 3/02 (2006.01)
(Continued)

(52) U.S. Cl.
CPC .............. B62D 7/224 (2013.01); F16C 3/023 (2013.01); F16D 3/12 (2013.01); F16D 3/68 (2013.01);
(Continued)

(58) Field of Classification Search
CPC . B62D 1/16; B62D 1/18; B62D 1/192; B62D 7/224; F16B 7/0413; F16C 3/023;
(Continued)

(56) References Cited

U.S. PATENT DOCUMENTS 5,259,818 A * 11/1993 Kachi ................... B62D 1/192
464/180
5,916,026 A    6/1999 Sadakata
(Continued)

FOREIGN PATENT DOCUMENTS

CN    1392077 A    1/2003
CN    1784331 A    6/2006
(Continued)

OTHER PUBLICATIONS

Translation of EP 0145572. Barnabe, et al. Steering Column Axle. Jun. 19, 1985.*
(Continued)

Primary Examiner — Josh Skroupa
(74) Attorney, Agent, or Firm — thyssenkrupp North America, Inc.

(57) ABSTRACT

A steering shaft for a motor vehicle may include a first shaft part and a second shaft part. The first and second shaft parts may be connected in a way such that torques are transferred. A damping element can be disposed between the first and second shaft parts for damping oscillations and/or vibrations. The damping element may contact a carrier along a contact area. The damping element may be coupled to the carrier at only a portion of the contact area. The carrier may be, for example, the first shaft part, the second shaft part, a sleeve, or a bushing.

19 Claims, 2 Drawing Sheets

(51) Int. Cl.
*F16D 3/12* (2006.01)
*F16D 3/68* (2006.01)
*F16F 15/126* (2006.01)
*F16D 3/76* (2006.01)

(52) U.S. Cl.
CPC .............. *F16D 3/76* (2013.01); *F16F 15/126* (2013.01); *F16C 2226/40* (2013.01); *F16D 2250/0069* (2013.01)

(58) Field of Classification Search
CPC ..... F16D 3/12; F16D 3/68; F16D 3/74; F16D 3/76; F16F 15/124; F16F 15/126
USPC ................ 464/88, 89, 92, 96, 150, 180, 182
See application file for complete search history.

(56) References Cited

U.S. PATENT DOCUMENTS

| | | | | |
|---|---|---|---|---|
| 6,123,481 | A * | 9/2000 | Oka | B62D 1/16 464/88 |
| 7,516,985 | B2 * | 4/2009 | Cymbal | B62D 1/185 280/775 |
| 8,801,526 | B1 * | 8/2014 | Conger | F16C 3/023 464/180 |
| 2002/0190450 | A1 | 12/2002 | Honda et al. | |
| 2005/0017493 | A1 | 1/2005 | Goto et al. | |
| 2007/0032302 | A1 * | 2/2007 | Mahling | B60K 17/22 464/89 |

FOREIGN PATENT DOCUMENTS

| | | | |
|---|---|---|---|
| DE | 10 2004 019 093 A1 | 11/2004 | |
| DE | 102008038029 A1 * | 8/2009 | ............... F16D 3/76 |
| DE | 202012011579 U1 | 1/2013 | |
| DE | 102012101386 A1 | 8/2013 | |
| EP | 0145572 A1 | 6/1985 | |
| FR | 2701518 B1 | 5/1995 | |
| FR | 2793535 A1 * | 11/2000 | ............... B62D 1/16 |
| GB | 897263 A * | 5/1962 | ............... F16D 3/76 |

OTHER PUBLICATIONS

Translation of FR 2701518. Barneoud, et al. Device for joining a shaft and a cardan fork especially for a motor vehicle steering column. Aug. 19, 1994.*
International Search Report for PCT/EP2015/053666 dated Apr. 17, 2015 (dated Apr. 28, 2015).
English Language Abstract for DE202012011579U1.
English language Abstract for FR 2701518 B1 listed above.
English language Abstract for CN 1784331 A listed above.

* cited by examiner

US 10,377,419 B2

STEERING SHAFT FOR A MOTOR VEHICLE

CROSS REFERENCE TO RELATED APPLICATIONS

This application is a U.S. National Stage Entry of International Patent Application Serial Number PCT/EP2015/053666, filed Feb. 20, 2015, which claims priority to German Patent Application No. 10 2014 102 408.7 filed Feb. 25, 2014, the entire contents of both of which are incorporated herein by reference.

FIELD

The present disclosure relates to steering shafts and, more particularly, to steering shafts that can be used in motor vehicles.

BACKGROUND

Providing steering shafts for motor vehicles, for which a first shaft part is connected with a second shaft part for transferring a torque by means of a loose positive connection, is known from the prior art. An elastic element, which is provided as an elastomer, which is disposed between an inner damping part and an outer damping part, is disposed between the first shaft part and the second shaft part. The inner damping part and the outer damping part can provide the loose positive connection between the first shaft part and the second shaft part. By means of the elastomer, which is disposed between the inner damping part and the outer damping part, vibrations, transferred over the steering shaft to the first shaft part, can be dampened with respect to the second shaft part. Such a steering shaft is known, for example, from the DE 10 2012 101 386 A1.

From the DE 20 2012 011 579 U1, a device is known for the damping connection of two shaft sections, for which a damping layer is provided between a radial inner bushing and a radial outer bushing, over which vibrations, which have been introduced into one shaft section, can be dampened with respect to the other shaft section.

Basically, it is desired to dampen oscillations and/or vibrations, which are brought into the steering system by the vehicle or by power assistance, in such a way, that they are not perceived by the driver as disorders in the form of noise or disturbance torques, which are transferred to the steering wheel. A challenge consists therein that the damping properties of a steering shaft are selectively designed for the specific problem, for example, the oscillation and/or vibration patterns introduced into the vehicle while it is being operated. It is therefore also an objective to cover a plurality of different oscillation and/or vibration patterns with one configuration of a steering shaft, which is as uniform as possible, and, correspondingly, to be able to operate different types of vehicles with a uniform configuration.

Adapting the respective damping properties, especially also the damping properties in the axial direction of the shaft sections, can be accomplished in the devices known from the prior art by dimensioning the elastomeric layer or damping layer and by the selection of the respective damping material or elastomeric material. Accordingly, a new dimensioning and/or a different material must be used for each application, as a result of which a flexible use of a steering shaft with fixed dimensions as well as identical parts for different applications is possible only to a limited degree.

DETAILED DESCRIPTION

Figure 1:
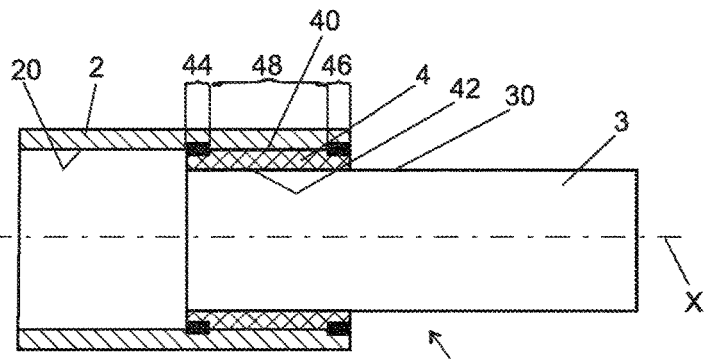
FIG. 1 is a sectional view of an example steering shaft that includes a damping element positioned between a first shaft part and a second shaft part.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

Starting out from the known prior art, it is an objective of the present invention to indicate a steering shaft, which makes a flexible adjustment of the damping properties possible for different applications.

Accordingly, a steering shaft for a motor vehicle with a first shaft part and a second shaft is proposed, which are connected with one another for transferring a torque and between which, for damping oscillations and/or vibrations that have been introduced, a damping element is disposed, which lies with one contact surface against a support. In accordance with the invention, the damping element is firmly connected with the carrier in at least a partial region of the contact area.

Owing to the fact that the damping element is connected firmly with the contact area of the carrier only in at least a partial region, which is also referred to hereinafter as the fixing region, an adjustment of the respective damping properties, especially of the damping properties in the axial direction of the steering shaft, can only be attained by a dimensioning of the respective partial region of the contact area, which is firmly connected with the carrier.

The damping behavior of the damping element in the axial direction of the steering shaft, for example, in the case of a firm connection of the damping element with the carrier in only a very small fixing region of the contact area and a correspondingly large region of the contact area, which is not connected with the carrier, is different than in the case of a firm connection of the damping element with the carrier over a larger partial region of the contact area or even a firm connection over the whole of the contact area. The damping behavior can correspondingly be adjusted flexibly by the dimensioning of the fixing region of the contact area, which is firmly connected with the carrier, and the same components can be used for the steering shaft. Only the extent of the fixing region of the contact surface, in which a firm combination is attained, is varied. In particular, due to the variation of the extent of the fixing region of the contact area, it is not necessary to use a different damping element in order to achieve a different damping behavior; instead, this can be achieved by varying only the extent of the fixing region of the contact area, which is firmly connected with the carrier.

By the firm connection of the fixing region of the contact area of the damping element with the carrier, the damping element is connected immovably with the carrier in this fixing region of the contact area and cannot move relatively to the carrier in this fixing region of the contact area. It is directly clear that a variation of the damping properties of the steering shaft can be achieved by a variation of the extent of the fixing region.

With that, the damping element preferably is not connected firmly with the carrier in a different region of the contact area. It is particularly preferred if there is a frictional connection between the damping element and the carrier in the region, which is not firmly connected with the carrier. In this way, it can be achieved that, in the region, which is not firmly connected with the carrier, a displaceability of the damping element with respect to the carrier is permitted and this affects the damping behavior of the damping element. The damping behavior of the steering shaft can best be adjusted over the dimensioning and the geometric design of the regions not connected with the carrier. Furthermore, a corresponding damping can be set by providing a frictional connection in the region of the contact area, which is not firmly connected with the carrier. The properties of the frictional connection can be adjusted by pre-stressing and by the material properties applied on the damping element.

A fixed connection of the damping element in a fixing region of the contact area with the carrier is also understood to mean that the damping element at the carrier lies essentially flat against the contact area, but is connected so firmly with the carrier only in a fixing region of this contact area, that the damping element cannot move in this fixing region with respect to the carrier. This firm connection can be attained, for example, by an adhesive bond, such as the one attained when a damping element is vulcanized with the carrier, or adhesively. Correspondingly, only one fixing the region of the contact area of the damping element is connected firmly or rigidly with the carrier, and the regions of the damping element, which are not connected with the carrier, are connected correspondingly only over a frictional connection.

For establishing such a connection in the case, for example, of a vulcanizing process, a bonding agent is applied between the damping element and the carrier only in the fixing regions of the contact surface, in which a firm connection between the damping element and the carrier is actually to be obtained. The other regions, in which such firm connection is not to be produced, correspondingly are not provided with the bonding agent, so that a firm connection between the damping element and the carrier does not take place in these regions.

Depending on the geometric construction of the carrier and the damping element, said connection of the damping element has only a very slight effect on the damping properties in a radial direction or it has no effect at all. On the other hand, the damping properties in the axial direction can be varied widely.

The carrier preferably is formed by the first shaft part, by the second shaft part, by a first sleeve disposed between the first shaft and the second shaft part, and/or by a second sleeve, which is formed between the first shaft part and the second shaft part. It is particularly preferred if the damping element is disposed between an outer sleeve and an inner sleeve, the outer sleeve and the inner sleeve being disposed between the first shaft part and the second shaft part.

In order to make it possible to have a clearance-free transfer of the torque, the damping element preferably is disposed under radial pre-stressing between the first shaft part and the second shaft part, between a shaft part and a sleeve and/or between two sleeves.

A reliable transfer of the torque is achieved preferably if there is a loose positive connection between the first shaft part and the second shaft part for transferring a torque and the damping element provides an elastic connection between the first shaft part and the second shaft part. In this connection, it is particularly preferred if the damping element is disposed between an outer sleeve and an inner sleeve, the inner sleeve being connected with the second shaft part and the outer sleeve being connected nonrotatably with the first shaft part and a loose positive connection is formed between the outer sleeve and the inner sleeve.

In order to be able to achieve a particularly flexible matching of the damping properties to the respective specifications, the fixing region of the contact area, in which the damping element is connected firmly with the carrier, is in the form of at least one strip, which extends in the circumferential direction and envelops the axial direction in closed fashion. It is particularly preferred if the fixing region, in which the damping element is firmly connected with the carrier, is formed by two strips, which are spaced apart from one another in the axial direction, the formation of which at the axial end regions of the damping element being particularly preferred.

Alternatively, the fixing regions may be in the form of at least one strip extending in the axial direction or at least one strip extending diagonally or helically or in the form of at least one spot or at least one point or at least two fixing regions, which are not connected with one another.

A clear impact on the damping properties results when the firmly connected partial region, that is, the summary area of all fixing regions, amounts to between 5% and 95% of the contact area, preferably between 5% and 70% and particularly between 5% and 40%. If a high elasticity in the longitudinal direction is to be attained, the areas of the fixing regions can also range from 5% to 20% of the total contact area.

The carrier preferably is provided in the form of a sleeve or a bushing and, especially preferred, in the form of an inner sleeve and an outer sleeve, between which the damping element is disposed.

In the following, preferred examples are described by means of the Figures. Identical, similar or equivalent elements in the different Figures have identical reference numbers and a repeated description of these elements is partly omitted in the following description, in order to avoid redundancies.

In FIG. 1, a steering shaft 1 is shown, which comprises a first shaft part 2 and a second shaft part 3. Between the first shaft part 2 and the second shaft part 3, a damping element 4 is disposed, which has a first contact area of 40, which lies against an inner wall 20 of the first shaft part 2. Furthermore, the damping element 4 has a second contact area 42, which lies against an outer wall 30 of the second shaft part 3.

In the example shown, the damping element 4 is provided in the form of an elastomeric layer, which is disposed between the first shaft part 2 and the second shaft part 3. However, the damping element 4 may also have any other design and materials as long as it provides the desired damping properties. In this connection, damping elements of rubber and elastic plastics, especially of elastomeric plastics, are preferred.

The damping element 4 is firmly connected with the first shaft part 2 in two partial regions 44, 46 of the contact area 40. In order to produce this firm connection, a bonding agent is applied, by means of which a substance-to-substance connection between the damping element 4 and a first shaft part 2 is attained by vulcanization only in the fixing regions 44, 46 of the contact area 40.

In the example shown, the carrier is formed by the first shaft part 2. However, as can be seen in the following, the carrier, to which the damping element 4 is attached, may also be formed by the second shaft part 3, by a first sleeve 5 (see FIG. 3), which is disposed between the first shaft part 2 and the second shaft part 3, and/or by a second sleeve 6, which is disposed between the first shaft part 2 and the second shaft part 3.

On the other hand, in the region 48 of the first contact area 40 of the damping element 4, which is disposed between the connected fixing regions 44, 46 of the contact area 40 and not connected with the shaft part 2, the damping element 4 is not firmly connected with the first shaft part 2. In this region 48, the damping element 4 only lies in contact with the inner wall 20 of the first shaft part 2. This contact may vary from a loose contact with clearance up to a press fit.

With that, the damping element 4 may be shifted with respect to the carrier, that is, in the first shaft part 2 in the not connected region 48. Depending on the respective surface nature or material nature of the inner wall 20 of the first shaft part 2 and of the contact area 40 of the damping element 4, corresponding friction, which dampens the displaceability of the damping element 4 with respect to the first shaft part 2, is also present in the region 48, which is not connected.

Depending on the thickness of the damping element 4, the latter may be disposed under a radial pre-stressing between the first shaft part 2 and the second shaft part 3. Correspondingly, in the partial region 48 of the first contact area 40 of the damping element 4, which is not connected with the first shaft part 2, there admittedly is a radial pre-stressing of the damping element 4, but no firm connection. Rather, in this not connected region 48 of the contact area 40, the damping element 4 can move at least in the axial direction X to a certain extent with respect to the carrier or with respect to the first shaft part 2. Correspondingly, for movement of the region 48, which is not connected with the shaft part 2, with respect to the first shaft part 2, it is only necessary to overcome the friction between the first contact area 40 of the damping element 4 and the inner wall 20 of the first shaft part 2.

Correspondingly, the damping element 4 in the two firmly connecting fixing regions 44, 46 of the contact area 40 is connected firmly or immovably in the axial direction X with the first shaft part 2 forming the carrier. In the region 48 of the contact area 40, which is not connected with the first shaft part 2, the damping element 4 is, however, movable with respect to the first shaft part 2 at least in the axial direction of the steering shaft 1.

By dimensioning and disposing the fixing regions 44, 46 of the contact area 40, in which the damping element 4 is firmly connected with the first shaft part 2 formed as the carrier, the damping properties of the damping element 4 can be varied at least in the axial direction X and adapted to the particular objective.

The connection of the damping element 4 with the first shaft part 2 may be provided as connected fixing regions 44, 46, which extend over the whole periphery of the damping element 4 and are then formed correspondingly as peripheral strips. Advantageously, at least two strips, which are at a distance from one another in the longitudinal direction X (=axial direction X) are provided as a fixing region 44, 46 viewed in the axial direction X. Preferably, the two fixing regions 44, 46 are disposed at the ends of the damping element 4. Advantageously, the strips are formed as closed areas.

Figure 5:
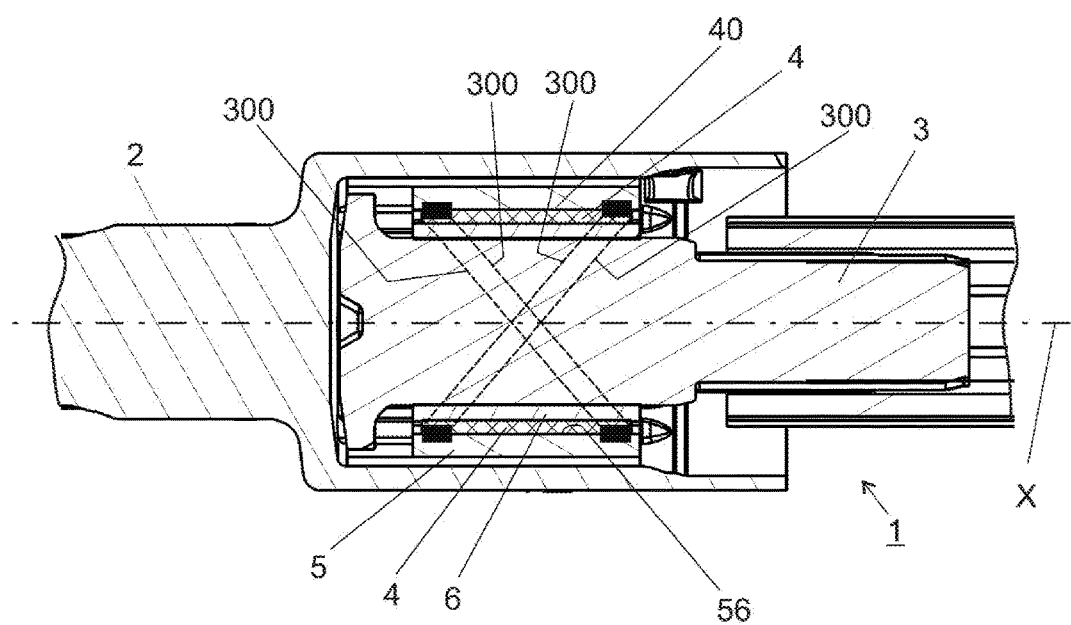
FIG. 5 is diagrammatic sectional view showing a longitudinal section of an example steering shaft for a motor vehicle with example diagonal fixing regions.

In formations, which are not shown here, firmly connected fixing regions can also be provided as strips, which extend in the axial direction X or diagonally, or as spots, points or as at least two fixing regions, which are not connected with one another, for example, as sectors. Furthermore, the fixing region 44, 46 of the contact area 40, in which the damping element 4 is connected firmly with the carrier, may be constructed in the form of at least one strip, at least one peripheral strip, at least one strip extending in the axial direction X, at least one strip extending diagonally or helically, at least one spot, at least one point or at least two fixing regions, which are not connected with one another. Still further, FIG. 5 depicts the example steering shaft 1 of FIG. 1 as modified with example diagonal fixing regions 300, as disclosed above.

The damping element 4 may also be connected firmly with the first shaft part 2 in only a single firmly connected fixing region, such as the fixing region 44, and then, in the remaining not connected region 48, not lie against the first shaft part 2. This may be achieved, for example, by dimensioning the damping element 4 and/or providing an appropriate adhesive, which provides a gap.

In a further development, which is not shown, the fixing region, in which the damping element 4 is connected firmly with the first shaft part 2, may also extend in the axial direction X, the fixing regions in that case being formed as strips extending in the axial direction, which are not connected with one another or at least leave one region 48 free, in which the damping element 4 is not connected with the first shaft part 2. Any other variations of the fixing regions, in which the damping element 4 is connected with the first shaft part 2, are conceivable, for example, a plurality of fixing regions, which are connected distributed over the contact area 40, in which a connection between the damping element 4 and the first shaft part 2 is produced, or any other arrangements.

The selective connection of the damping element 4 with the carrier, which does not take place over the entire surface but only in the fixing regions 44, 46, is attained owing to the fact that only the fixing regions 44, 46, in which a firm connection with the carrier is to be produced, are provided with an appropriate bonding agent or an appropriate adhesive, so that the firm connection while gluing or vulcanizing the damping element 4 to the first shaft part 2 is attained correspondingly only in these fixing regions. This can also be attained simply by covering regions of the surface with a template, during the surface treatment for forming the bonding agent. The surface treatment may then be carried out simply by applying the bonding agent on the surface or by a plasma treatment of the surface.

This firm connection between the damping element 4 and the respective carrier may be attained only on one side of the damping element 4, namely the contact area 40, or also on both sides of the damping element 4, namely on the first contact area 40 as well as on the second contact area 42.

Figure 2:
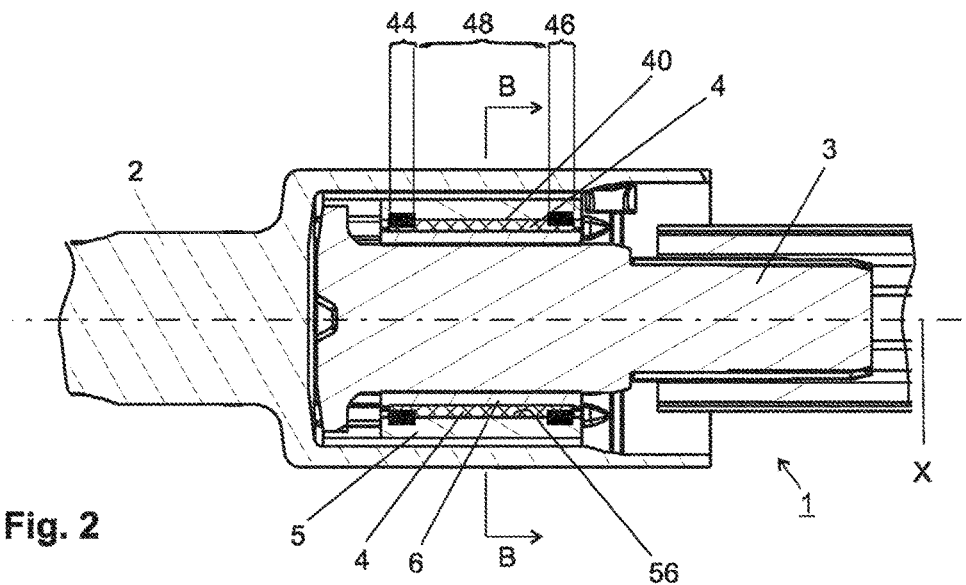
FIG. 2 is a diagrammatic sectional view showing a longitudinal section of an example steering shaft for a motor vehicle.
Figure 3:
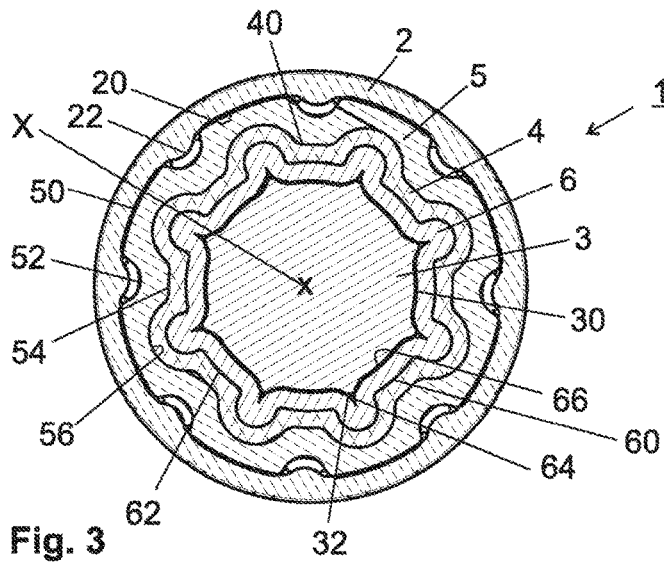
FIG. 3 is a sectional view taken across line B-B of the example steering shaft in FIG. 2.

In FIGS. 2 and 3, a further example of a steering shaft 1 is shown, FIG. 2 showing a sectional view along the axial direction X and FIG. 3 showing a cross-sectional view perpendicular to the axial direction X and along the section B-B of FIG. 2.

Once again, a first shaft part 2 and a second shaft part 3 are provided. Between the first shaft part 2 and the second shaft part 3, a damping element 4 is shown, which again is constructed as an elastomeric layer. In the example shown, the damping element 4 is taken up between an outer sleeve 5 and an inner sleeve 6, which is radial thereto. In the example shown, the outer sleeve 5 is constructed as the carrier. A connection of the damping element 4 by the first contact area 40 thereof with the outer sleeve 5 takes place in two partial regions 44, 46 of the contact area 40. The intermediate, not connected region 48 of the first contact area 40 of the damping element 4 is not connected with the outer sleeve 5, so that there is displaceability here, at least in the axial direction X of the steering shaft 1.

As can be seen in FIG. 3, the arrangement of the first shaft part 2, the outer sleeve 5, the inner sleeve 6 and the second shaft part 3 forms a loose positive connection, so that the transfer of a torque from the second shaft part 3 to the first shaft part 2 with clearance would be possible even without the presence of the damping element 4. For this purpose, protrusions 22 are provided at the inner wall 20 of the first shaft part 2 and engage corresponding recesses 52 in the outer wall 50 of the outer sleeve 5. Protrusions 54 in the inner wall 56 of the outer sleeve 5 engage recesses 62 in the outer wall 60 of the inner sleeve 6. The inner sleeve 6 is also connected positively with the second shaft part 3 owing to the fact that protrusions 32 are provided in the outer wall 30 of the second shaft part 3, which engage complementary recesses 64 in the inner wall 66 of the inner sleeve 6.

The loose positive connection also exists correspondingly, if the damping element 4 is not present or was destroyed by wear.

The damping element 4 is disposed in the space between the inner wall 56 of the outer sleeve 6 and the outer wall 60 of the inner sleeve 6 and follows the contours of the respective elements. Depending on the dimensioning of the damping element 4, the latter is pre-tensioned at least radially to the outside, so that a clearance-free but elastic transfer of a torque can be attained between the first shaft part 2 and the second shaft part 3.

Figure 4:
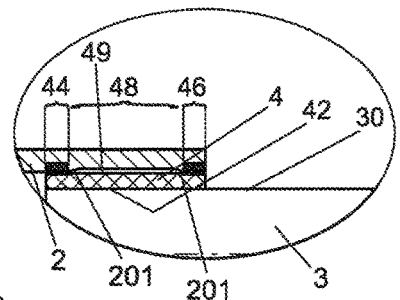
FIG. 4 is a diagrammatic view of another example steering shaft.

A further embodiment of the invention is shown in FIG. 4. In contrast to the embodiment in FIG. 1, a space 49 is disposed between the fixing regions 44, 46 between the inner surface of the first shaft part 2 and the damping element. In this region, there is therefore no contact between the damping element 4 and the shaft part 2. A transition to the respective fixing regions is created by ramps 201 in the inner wall 20. In this way, the partial fixing of the damping element can also be prepared with a simple press fit. However, this variation is less flexible and therefore less preferred.

The damping properties of the system, especially in relation to the damping properties in the axial direction X, can be adjusted by the dimensioning or the variation of the dimensioning of the fixing regions 44, 46 of the contact area 40, in which the damping element 4 is firmly connected with the outer sleeve 5, in relation to the in-between region 48 of the contact area 40, in which such a firm connection is not present.

The arrangement of the outer sleeve 5, the damping element 4 and the inner sleeve 6 can also be provided separately and installed as a bearing bushing.

In so far as is applicable, all individual features, which are presented in the individual examples, can be combined with one another and/or exchanged, without leaving the scope of the invention.

What is claimed is:

1. A steering shaft for a motor vehicle comprising:
   a first shaft part connected to a second shaft part for transferring torques between the first and second shaft parts; and
   a damping element disposed between the first shaft part and the second shaft part, the damping element for damping at least one of oscillations or vibrations, wherein the damping element contacts a carrier along a contact area and is adhesively bonded to the carrier only at a fixing region, wherein the fixing region occupies only a portion of an axial length of the contact area, wherein the carrier is a sleeve disposed between the first shaft part and the second shaft part.

2. The steering shaft of claim 1 wherein friction between the carrier and the damping element exists in a region of the contact area outside of the fixing region.

3. The steering shaft of claim 1 wherein the sleeve is an outer sleeve, the steering shaft further comprising an inner sleeve, the inner and outer sleeves disposed between the first and second shaft parts, wherein the damping element is disposed between the inner and outer sleeves.

4. The steering shaft of claim 1 wherein the damping element is disposed under a radial pre-stress between the first and second shaft parts, between the first shaft part or the second shaft part and the sleeve, or between the sleeve and a second sleeve.

5. The steering shaft of claim 1 wherein the damping element provides an elastic connection between the first and second shaft parts.

6. The steering shaft of claim 5 wherein a connection between the first shaft part and the second shaft part allows for at least some degree of rotational play between the first and second shaft parts, but causes torque to be transferred between the first and second shaft parts independent of the elastic connection provided by the damping element.

7. The steering shaft of claim 6 wherein the sleeve is an inner sleeve, wherein the damping element is disposed between the inner sleeve and an outer sleeve, with the inner sleeve being in non-rotatable contact with the second shaft part and the outer sleeve being in non-rotatable contact with the first shaft part, wherein the connection that allows for at least some degree of rotational play between the first and second shaft parts is between the outer sleeve and the inner sleeve.

8. The steering shaft of claim 1 wherein the fixing region is in a form of at least one strip that extends in a peripheral direction about an entire perimeter of either the damping element or the carrier.

9. The steering shaft of claim 1 wherein the fixing region occupies 5% to 95% of the contact area.

10. The steering shaft of claim 1 wherein the fixing region occupies 5% to 40% of the contact area.

11. The steering shaft of claim 1 wherein the fixing region occupies 5% to 70% of the contact area.

12. The steering shaft of claim 1 wherein the sleeve is an inner sleeve, the steering shaft further comprising an outer sleeve, the inner and outer sleeves disposed between the first and second shaft parts, wherein the damping element is disposed between the inner and outer sleeves.

13. The steering shaft of claim 1 wherein the fixing region is in a form of at least one strip disposed diagonally around a perimeter of either the damping element or the carrier.

14. The steering shaft of claim 1 wherein the fixing region is in a form of at least two strips disposed in an axial direction along either the damping element or the carrier.

15. A steering shaft for a motor vehicle comprising:
a first shaft part connected to a second shaft part in a way such that torques are transferred between the first and second shaft parts; and
a damping element disposed between the first shaft part and the second shaft part, the damping element for damping at least one of oscillations or vibrations, wherein the damping element is coupled to a carrier only at a first fixing region and a second fixing region, wherein at a location between the first and second fixing regions a radial gap exists between the carrier and the damping element.

16. The steering shaft of claim 15 wherein the carrier to which the damping element is connected is one of the first shaft part, the second shaft part, a bushing, or a sleeve.

17. The steering shaft of claim 15 wherein the carrier is the first shaft part, wherein the carrier comprises transition ramps between the first and second fixing regions and a portion of the first shaft part that is aligned with the radial gap between the carrier and the damping element.

18. The steering shaft of claim 15 further comprising an inner sleeve and an outer sleeve, the inner and outer sleeves disposed between the first and second shaft parts, wherein the damping element is disposed between the inner and outer sleeves, wherein the carrier is the first shaft part, the second shaft part, the inner sleeve, or the outer sleeve.

19. The steering shaft of claim 15 wherein in the fixing region the damping element is coupled to the carrier by at least one of an adhesive or a material bond.

* * * * *